Sept. 3, 1968 D. R. P. HAIG 3,400,035
DECORATIVE PLASTIC PANEL AND METHOD OF MANUFACTURE
Filed Dec. 10, 1964 2 Sheets-Sheet 2

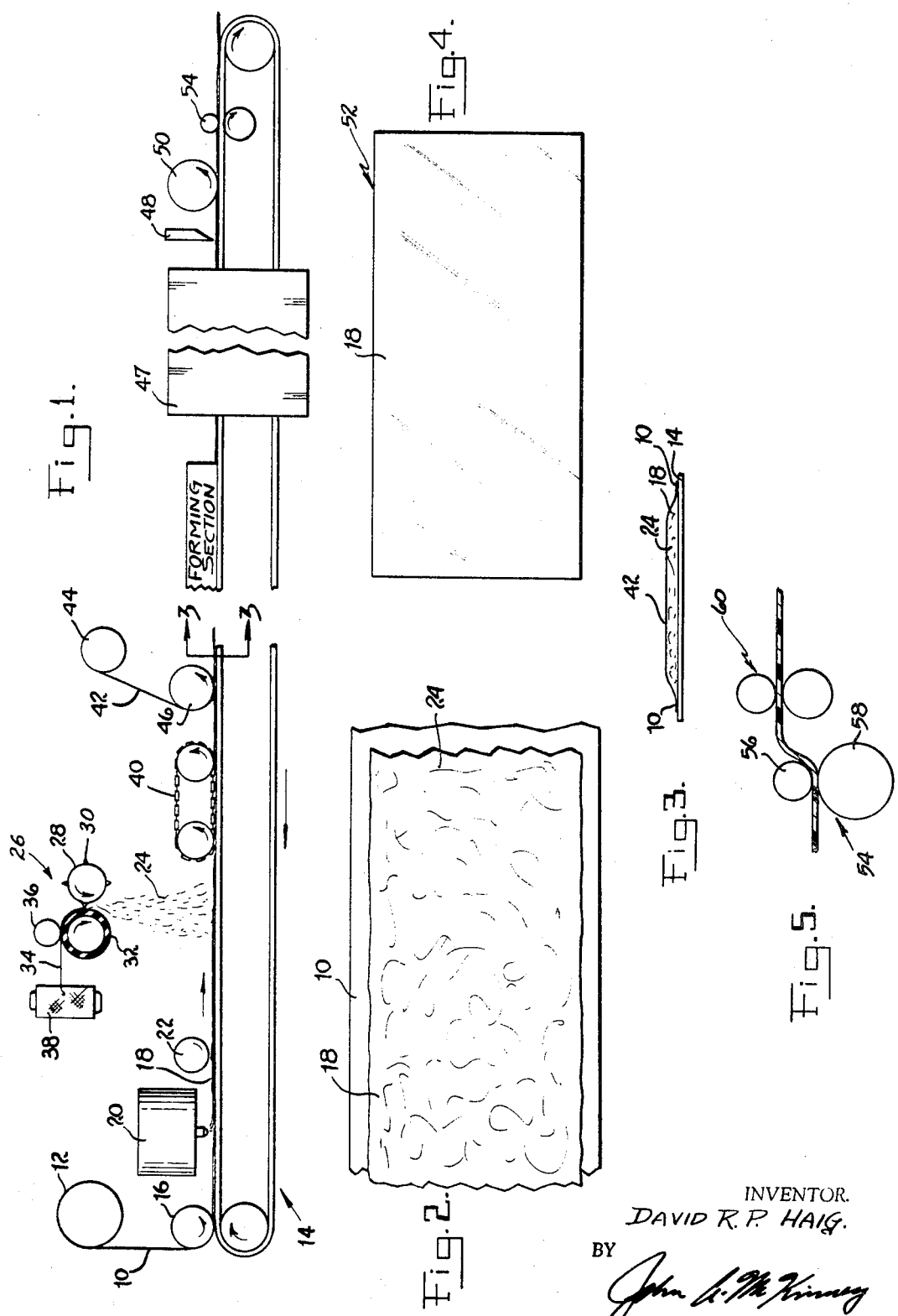

INVENTOR.
DAVID R. P. HAIG
BY
ATTORNEY

United States Patent Office 3,400,035
Patented Sept. 3, 1968

3,400,035
DECORATIVE PLASTIC PANEL AND METHOD OF MANUFACTURE
David Robert Pace Haig, South Plainfield, N.J., assignor to Johns-Manville Corporation, New York, N.Y., a corporation of New York
Filed Dec. 10, 1964, Ser. No. 417,434
15 Claims. (Cl. 161—1)

ABSTRACT OF THE DISCLOSURE

A thermoset resin panel containing fibrous reinforcement is bowed or flexed to such a degree, without imparting a permanent set to the panel, that the bond between the resin and some of the fibers is broken, providing the panel with a unique decorative appearance.

---

This invention relates to a plastic panel or sheet of thermoset resin reinforced with fibrous material. More particularly, the invention relates to such a panel which presents a unique, highly pleasing decorative appearance. The invention further relates to a method for producing such a panel.

Thermoset plastic panels reinforced with fibrous material are well known. When used in the home, they often serve as patio or porch enclosures, or as room dividers or other decorative interior panels. In commercial buildings, they often find use as partition dividers or as decorative panels in lobbies and other large rooms. While such panels are usually able to withstand a certain amount of stress, their use, for the most part, is decorative, and attempts have been made over the years to improve and vary their decorative appearance.

Reinforced thermoset plastic panels are available in many different colors, either translucent or opaque. When translucent resin is employed, the fibrous reinforcing material is selected to have an index of refraction about equal to the index of refraction of the resin so that the reinforcing material is substantially invisible to the eye. Thus, not only is light permitted to pass through the panel, but the relatively dense, haphazardly arranged fibrous material is concealed. Panels are also available in a number of different cross-sectional shapes and in a number of different types of textured surfaces.

Other panels containing a predetermined design have been produced by embedding a sheet or other membrane having a design thereon in the body of a translucent resin layer. While any number of different designs can be used in this manner to create a great variety of different appearances and decorative panel effects, such panels are costly to produce and do not readily lend themselves to continuous manufacture. It would be highly desirable to provide an attractive reinforced plastic panel which presents a different decorative appearance than the panels presently on the market and which can be manufactured on a continuous manufacturing line.

It is an object of the present invention, therefore, to provide a reinforced thermoset plastic sheet or panel which has a different and highly pleasing decorative appearance.

Another object of the invention is to provide such a panel wherein the decorative appearance is an internal effect and can be utilized with either smooth-faced or textured panles.

A further object of the invention is to provide a method of producing a reinforced thermoset plastic sheet or panel, which method easily can be incorporated into present manufacturing lines.

Another object of the invention is to provide a method of forming a design in a reinforced thermoset plastic panel, which method can be employed either as a part of the manufacturing process or at any time after the panel has cured and hardened.

The foregoing objects are satisfied by the decorative plastic panel of the present invention and by its method of manufacture. Briefly described, the panel comprises a layer of translucent thermoset resin having fibrous reinforcements therein, the index of refraction of the resin being closely matched with the index of refraction of the fibrous material to cause the reinforcement normally to be substantially invisible. The bond between a substantial number of reinforcing fibers and the resin is at least partially fractured, thereby exposing the fractured resin adjacent the fibers to view. The bond is broken by flexing or bowing the hardened, cured panel to a degree sufficient to fracture the bond but not enough to provide the panel with a permanent bowed or curved set. Thus, the resulting panel is a flat sheet of the type well known in the art, but in addition, having a number of fracture lines extending substantially in the direction of the axis about which the sheet was flexed or bowed, or stated another way, extending substantially in the direction of flexure or bowing.

Although the fracture lines do follow the path, or a portion of the path, of the reinforcing fibers, they do not at all resemble such fibers. The fracture lines are of less thickness than the thickness of a reinforcing strand and they have a jagged or crystalline appearance. The fracture lines are of the same color as the translucent resin employed but are somewhat lighter and brighter since they reflect and defract transmitted and reflected light. While the design appearance of the fracture lines is random, in that it cannot be reproduced exactly, by varying the fracturing procedure different designs or patterns of the same overall appearance can be achieved.

The nature of the invention will be more fully understood and other objects may become apparent when the following detailed description is considered in connection with the accompanying drawing, wherein:

FIG. 1 is a diagrammatic representation of a method of manufacturing a panel of the present invention;

FIG. 2 is a plan view of a panel in an intermediate stage of manufacture;

FIG. 3 is a transverse sectional view of a laminate, taken on line 3—3 of FIG. 1;

FIG. 4 is a plan view of a cured panel of the prior art;

FIG. 5 is an enlarged side elevation of the bending rolls utilized in performing the process of the present invention;

Figure 6:
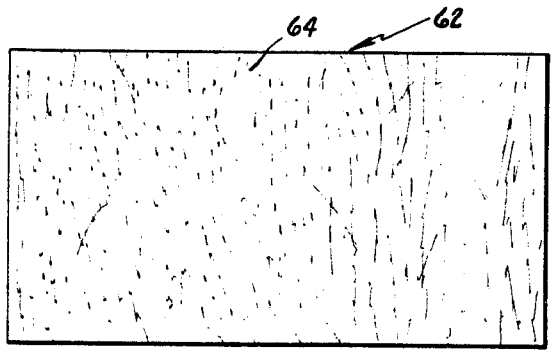
FIG. 6 is a plan view of a sheet or panel of the present invention.

In FIG. 1 of the drawing a typical arrangement for manufacturing reinforced thermoset plastic panels is illustrated. A web 10, drawn from a roll 12 of cellophane, or other suitable cover sheet material, is guided to a continuously moving conveyor 14 by guide roll 16. A short distance from the roll 16, in the direction of movement of the coveyor, a layer or pool of resin 18 is deposited on the base cover sheet 10 from a resin source or distributor 20. Any suitable type of thermosetting resin may be employed, either alone or in combination with other thermosetting resins. Examples of such resins, which are well known in the art, are polyester resins, acrylic resins and residues of certain phenol or urea formaldehyde resins. One commercially available polyester resin suitable for use in the manufacture of such panels is Laminac resin, manufactured by the American Cyanamid Company.

Immediately adjacent the downstream side of the distributor or dispensor 20 is a metering device 22, shown in this case as a roll which may be provided with grooves or other configurations for smoothing out the pool of resin 18 to form a layer of uniform thickness and extent. After the layer of resin has been formed, fibrous reinforcing material 24 is deposited on the pool by means of a chopping device 26, illustrated as comprising a rotating cylinder 28 carrying a knife blade 30 which coacts with a backing roll 32. One or more continuous strands of reinforcing material 34 are fed between the backing roll 32 and a guide roll 36 mounted vertically adjacent the roll 32, the strands being unwound from a roll 38 or other supply of reinforcing material. Endless chains 40, or some other suitable device, are provided downstream from the fiber deposition station for the purpose of embedding and thoroughly wetting the reinforcing material in the layer of resin. While one method of introducing the reinforcing material into the resin is illustrated, it should be borne in mind that there are other methods of accomplishing the same purpose. A previously formed bonded mat of fibrous material may be deposited into the pool of resin, instead of using chopped strands, or the mat may be run through a pool or dip tank containing resin and the resulting saturated mat may be deposited on the base cover sheet, thereby dispensing with both the resin distributor 20 and the fibrous material cutting apparatus 26. The type of reinforcing material commonly used in the art is glass fiber which has a refractive index substantially the same as that of the resin so that the fibers are substantially invisible in the final translucent product.

At this point in the manufacturing process, the material resting on the conveyor 14 appears as shown in FIG. 2. The base cover sheet 10 probably will extend somewhat beyond the boundary of the resin layer 18, and a rather large amount of reinforcing material will be embedded in the resin, as indicated at 24. The fibers 24 may be of varying lengths but are illustrated as being two to four inches in length and haphazardly arranged, lying in random directions in the resinous layer.

After the reinforcing material has been completely embedded in the resin, an upper cover sheet or web of suitable material 42, preferably cellophane, is drawn from roll 44 and guided around combining roll 46 where it is deposited on the upper surface of the resin layer. The laminate of materials, as it appears after the upper cellophane sheet has been applied is illustrated in FIG. 3, which shows the base cover sheet 10 and the upper cover sheet 42 enclosing the layer of resin 18 reinforced with fibrous material 24. As is well known in the art, the cover sheets are provided primarily to exclude air from the laminate and thus prevent the air from interfering with polymerization of the resin. In addition to this function, however, the cover sheets serve as excellent carrier sheets which hold the resin in sheet form and cause the major surfaces of the resin layer to be smooth. Textured cover sheets have also been utilized, which transfer their textured appearance to the surfaces of the resin layer.

Returning to FIG. 1, at this point in the manufacturing operation the sandwich or laminate is subjected to heat and, if desired, is passed over a forming section for changing its cross-sectional shape. After further heat treatment, such as by transporting the sandwich through an oven 47 for a predetermined length of time and at a predetermined temperature, the laminate exits from the oven completely cured and hard. Conventionally, the cured web of the laminate is transversely cut to length by a saw or knife 48, and the side edges are trimmed by trimming saws 50, after which the cellophane cover sheets may be stripped. In a continuous operation, of course, the transverse cutter 48 would be of the flying saw type.

The panel after exiting from the oven and being cut to size, is illustrated in FIG. 4, which shows a panel 52 of flat configuration with only the transparent or translucent thermoset resin 18 visible. This is typical of panels of the prior art. While various colors of resin can be used and while the shape of the panel may be altered, including altering the surface texture thereof, the basic appearance of the panel is the same since the panel body itself is comprised of translucent resin.

The present invention contemplates the addition of bending rolls 54 to the manufacturing line, shown in FIG. 1 for purposes of illustration as being at a point downstream from the cutting and trimming saws. Referring to FIG. 5, the bending rolls 54 comprise an upper, relatively small diameter roll 56, and a lower, relatively large diameter roll 58. Upon feeding a panel through the nip of the bending rolls, the panel will be bent in a direction toward the smaller diameter roll 56 much in the same manner as sheet metal is bent by the action of tinsmith rolls. The pressure applied by the bending roll 54 is sufficient to cause the panel to bow or flex, thereby placing the portion of the panel on one side of the neutral axis in tension and the portion of the panel on the other side of the neutral axis in compression. It has been found that only a relatively small amount of flexing in required to break the bond between some of the fibers and the resin. In practice, the bond between fibers and resin was fractured readily by use of bending rolls which caused the panel to be curved or flexed about a radius of two inches. Since all portions of the panel are progressively subjected to the bending rolls, the bond between a portion of the reinforcing fibers and the cured resin is fractured throughout the length of the panel. Although cured thermoset resin sheets or panels are hard, nevertheless, they can be flexed or bowed in the manner described. This does not result in a permanent set being formed but, as illustrated in FIG. 5 by the material passing through the subsequent set of rolls 60, the panel readily returns to its flat condition.

The panel 62, shown in FIG. 6 of the drawing, illustrates a rectangular panel which has been manufactured according to the process of the present invention. By subjecting the panel to the action of bending rolls which flex the panel in a direction transversely of its length, the fracture lines 64 were made to appear. Keeping in mind the very haphazard arrangement of the fibers 24 illustrated in FIG. 2, it can be seen that only a rather small amount of the fibrous reinforcing material actually is affected by the flexing or bending operation. As illustrated in FIG. 6, the flexing operation fractures the resin bond of only some of the fibers which extend in the general direction of the axes of the bending rolls.

Figure 7:
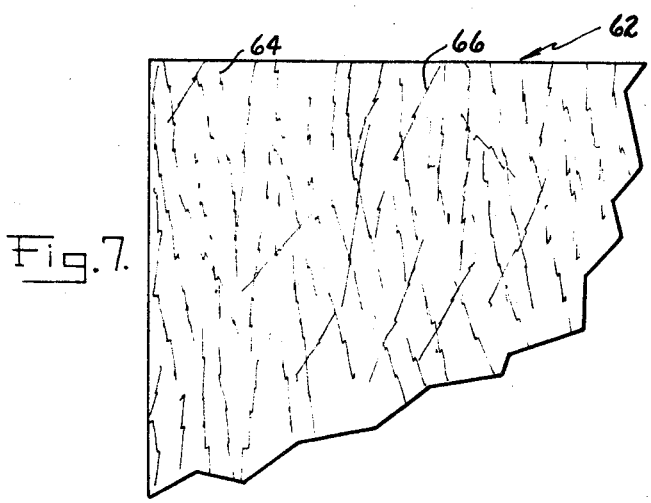
FIG. 7 is an enlarged plan view of a portion of the panel of FIG. 6, showing in more detail the directional fracture lines in the panels.

The appearance of the panel of the present invention is more clearly shown in FIG. 7, which is an enlarged view of a portion of the panel of FIG. 6. It can be seen that the fracture of the bond between the fibers and the resin does not result merely in bringing to view the fibers as they originally appeared but results in a fracture line of considerably different appearance. The width of a fracture line is not constant throughout its length, nor does it correspond to the width of a strand of fibrous material. As shown in FIG. 7, the fracture line 64 is provided with a number of jagged portions 66, revealing somewhat the crystalline structure of the resin. This effect is not uniform but occurs at random, apparently because the bond between a fiber and the cured resin is seldom completely fractured about the entire circumference of the fiber but only at portions thereof. Because light is not reflected back to the eye at the same angle as light reflected both by the resin and by the fibrous material, the fracture line is very evident and appears as a lighter, brighter, sharp, jagged line of the same color as the resin within the resinous body.

Figure 8:
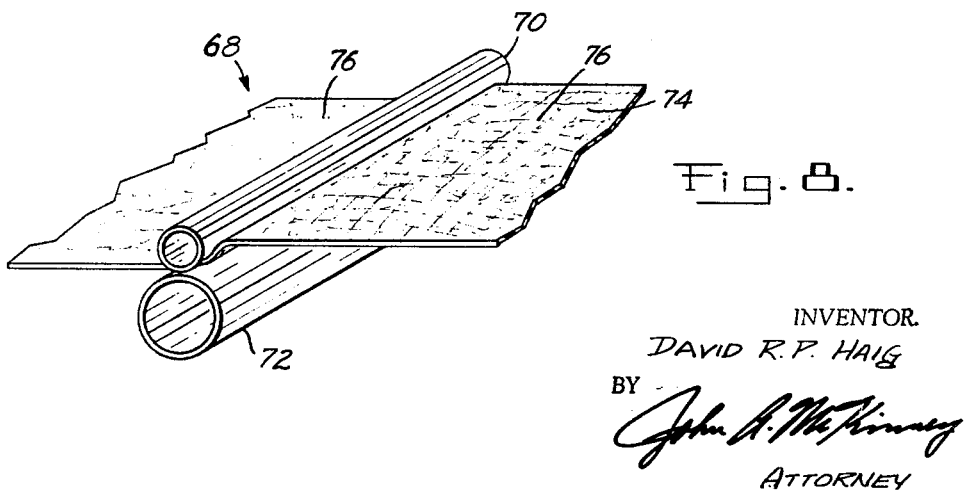
FIG. 8 is a pictorial representation of a bending or flexing operation being performed on a plastic panel to provide it with a modified appearance.

The appearance of the panel of the present invention may be varied by a number of means. The number of fracture lines which appear in the finished panel can be controlled to a large extent by the pressure applied by the bending rolls. The less pressure or force applied, the fewer fracture lines will appear and, conversely, the more pressure applied, the more fracture lines will appear. To bring out fracture lines extending in directions other than the general direction of the bending rolls, which form fracture lines transverse to the direction of movement of the panel through the rolls, a panel which has been subjected to a flexing or bending operation may again be subjected to bending rolls, but at a different angle than the first time. This method is illustrated in FIG. 8, which shows a panel 68 passing between the nip of bending rolls 70, 72 to form fracture lines 74 in a direction substantially transverse to the fracture lines 76 previously formed in the panel.

It should now be apparent that the present invention provides a reinforced thermoset plastic panel which has a unique decorative appearance caused by its internal structure. Although some of the bonds between the reinforcing material and the resin are destroyed by the present invention, the weakening of the panel is very minor since the fracturing affects only a small portion of the reinforcement. Moreover, the use of such panels for their decorative effect does not require them to bear any significant structural loads. Thus, the pattern or design imparted by the present invention does not practicably limit the use to which the panels might be put.

Although the flexing operation has been shown as the last step in a continuous manufacturing line, it should be recognized that the flexing might be done at any time after the manufacture of the cured thermoset resin panel. If desired, it need not be done by bending rolls, although they are illustrated and described in this application as being the preferred and probably the most efficient and practical means for performing the operation. It has been found that fracture lines can be imparted by a hand flexing operation; that is, by grasping the panel and causing it to bow to such an extent that some fracturing takes place. This method, of course, is crude and not preferred since there is little control over the overall pattern of the fracture lines and since it can be performed only at a very slow rate. As previously mentioned, while the invention has been described with respect to relatively short lengths of reinforcing material which, in forming had been immersed in a resin pool, a previously bonded mat of glass fibers can be used instead without adversely affecting the appearance of the resultant product.

It is to be understood that other variations and modifications of the present invention may be made without departing from the spirit of the invention. It also is to be understood that the scope of the invention is not to be interpreted as limited to the specific embodiments disclosed herein, but only in accordance with the appended claims, when read in the light of the foregoing disclosure.

What I claim is:

1. A decorative plastic panel comprising:
    (a) a layer of translucent thermoset resin having fibrous reinforcement therein, the major faces of the layer comprising thermoset resin and the fibrous reinforcement being located between said major faces,
    (b) the index of refraction of the resin being closely matched with the index of refraction of the fibrous reinforcement to cause the reinforcement normally to be substantially invisible, and
    (c) the bond between the resin and a substantial number of reinforcing fibers between the major faces of the layer of thermoset resin being at least partially fractured,
    (d) the fractured resin being visible.

2. A decorative plastic panel as recited in claim 1 wherein the lines of fractured resin extend substantially in the same general direction.

3. A decorative plastic panel as recited in claim 1, wherein the fibers are glass fibers.

4. A decorative plastic panel comprising:
    (a) a layer of cured, translucent thermoset resin, containing haphazardly arranged reinforcing fibers therein, the major faces of the layer comprising thermoset resin and the reinforcing fibers being located between said major faces,
    (b) the index of refraction of the resin being substantially equal to the index of refraction of the reinforcing fibers to cause the fibers normally to be substantially invisible, and
    (c) the bond between the resin and a substantial number of reinforcing fibers between the major faces of the layer of thermoset resin being at least partially fractured in a generally unidirectional arrangement,
    (d) the fractured resin being visible.

5. A method of producing a decorative appearance in a cured, translucent, thermoset resin sheet containing reinforcing fibers bonded to the cured resin, the index of refraction of the resin being substantially identical to the index of refraction of the reinforcing fibers, comprising the step of:
    (a) bowing the sheet in a predetermined direction an amount sufficient to fracture the bond between the resin and a substantial number of fibers extending generally in the direction of the bowing, but not sufficient to impart a permanent curved set in the panel, whereby the fracture lines of resin so produced are visible.

6. A method of producing a decorative appearance in a cured, translucent, thermoset resin sheet as recited in claim 5, wherein the bowing operation proceeds progressively transversely of the direction of the bowing.

7. A method of producing a decorative appearance in a cured, translucent, thermoset resin sheet as recited in claim 6, including the additional step of further progressively bowing the sheet after the first bowing operation at substantially right angles thereto.

8. A method of producing a decorative appearance in a cured, translucent, thermoset resin sheet as recited in claim 6, wherein the bowing of the sheet is achieved by passing the sheet through the nip of a pair of bending rolls.

9. In a method of manufacturing a reinforced plastic panel comprising the steps of:
    (a) enclosing between upper and lower cover sheets a layer of translucent thermosetting resin containing haphazardly arranged reinforcing fibers,
    (b) the index of refraction of the reinforcing fibers being substantially the same as the index of refraction of the resin so that the fibers are substantially invisible in the layer, and
    (c) curing the resin to form a hard, flexible panel having reinforcing fibers bonded to the cured resin, the improvement comprising the step of
    (d) flexing the panel an amount insufficient to produce a permanent set in the panel, but sufficient to fracture the bond between the resin and a substantial number of fibers extending generally in the direction of the flexing.

10. A method of manufacturing a reinforced plastic panel as recited in claim 9, wherein the panel is flexed progressively transversely of the direction of the flexing.

11. A method of manufacturing a reinforced plastic panel as recited in claim 10, wherein the reinforcing fibers are glass fibers.

12. A method of manufacturing a reinforced plastic panel as recited in claim 10, wherein the panel is flexed by passing it through the nip of a pair of bending rolls, one of the rolls having a smaller diameter than the other.

13. A method of manufacturing a reinforced plastic panel as recited in claim 12, including the additional step of passing the panel through the nip of straightening rolls after the flexing operation.

14. A method of manufacturing a reinforced plastic panel as recited in claim 10, including the additional step of progressively flexing the panel a second time in a direction substantially transverse to the direction of the first flexing operation.

15. A method of manufacturing a reinforced plastic panel, comprising the steps of:
  (a) depositing a pool of resin on a base cover sheet,
  (b) depositing fibrous material in the pool of resin,
  (c) covering the pool of resin with an upper cover sheet,
  (d) curing the resin to form a hard, flexible panel having reinforcing fibers bonded to the cured resin, and
  (e) transversely flexing the panel progressively along the length thereof an amount sufficient to fracture the bond between the resin and a substantial number of fibers extending generally in the direction of the flexing, whereby the fracture lines so produced are visible.

References Cited
UNITED STATES PATENTS 3,061,496  10/1962  Meyer _____ 161—151 X
3,198,688   9/1965  Yoder _____ 161—97

ROBERT F. BURNETT, *Primary Examiner.*
ROGER L. MAY, *Assistant Examiner.*